United States Patent
Arrow et al.

(10) Patent No.: US 6,175,917 B1
(45) Date of Patent: Jan. 16, 2001

(54) METHOD AND APPARATUS FOR SWAPPING A COMPUTER OPERATING SYSTEM

(75) Inventors: Leslie J. Arrow, Mountain View; Henk J. Bots, Hollister; Mark R. Hoke, San Jose; William E. Hunt, Saratoga; Russell C. Jones, San Jose, all of CA (US)

(73) Assignee: VPNet Technologies, Inc., Milpitas, CA (US)

( * ) Notice: Under 35 U.S.C. 154(b), the term of this patent shall be extended for 0 days.

(21) Appl. No.: 09/065,899

(22) Filed: Apr. 23, 1998

(Under 37 CFR 1.47)

(51) Int. Cl.[7] .............................................. G06F 9/00
(52) U.S. Cl. ...................................... 713/1; 713/100
(58) Field of Search ................................ 713/1, 100, 2

(56) References Cited

U.S. PATENT DOCUMENTS

| | | | | |
|---|---|---|---|---|
| 4,530,052 | * | 7/1985 | King et al. ............................ | 364/200 |
| 4,747,040 | * | 5/1988 | Blanset et al. ........................ | 709/108 |
| 5,504,904 | * | 4/1996 | Dayan et al. ......................... | 395/700 |
| 5,564,054 | * | 10/1996 | Bramnick et al. ..................... | 713/2 |
| 5,734,380 | * | 3/1998 | Adams et al. ......................... | 345/340 |
| 5,806,078 | * | 9/1998 | Hug et al. .............................. | 707/511 |
| 5,835,726 | * | 11/1998 | Shwed et al. .................... | 395/200.59 |
| 5,835,761 | * | 11/1998 | Ishii et al. ............................. | 395/653 |
| 5,987,605 | * | 11/1999 | Hill et al. .............................. | 713/2 |
| 6,079,016 | * | 6/2000 | Park ...................................... | 713/2 |
| 6,088,794 | * | 7/2000 | Yoon et al. ............................ | 713/2 |
| 6,108,780 | * | 8/2000 | Aoki ..................................... | 713/2 |

* cited by examiner

Primary Examiner—Robert W. Beausoliel, Jr.
Assistant Examiner—Rita Zeimer
(74) Attorney, Agent, or Firm—Park & Vaughan LLP

(57) ABSTRACT

One embodiment of the present invention provides a computer system with a plurality of storage memories, each storage memory storing an operating system program, and an identifier for identifying a storage memory containing an operating system program to be loaded when the unit is booted. The identifier is selectively switchable between storage memories so that the computer system may be selectively booted with an alternate operating system program. This facilitates loading a new version of an operating system, and then rapidly switching back to an old version of the operating system if the new version fails to function properly.

39 Claims, 12 Drawing Sheets

METHOD AND APPARATUS FOR SWAPPING A COMPUTER OPERATING SYSTEM

BACKGROUND

1. Field of the Invention

The present invention relates to the field of data communications. More specifically, the present invention relates to a device for processing data communications and a method of configuring such a device to selectively operate according to one of a plurality of stored operating system programs.

2. Related Art

In recent years, organizations have come to rely heavily upon their ability to communicate data electronically between their members, representatives, employees, etc. Such communications typically include electronic mail and some form of file sharing or file transfer. In a centralized, single site organization, these communications are most commonly facilitated by a local area network (LAN) installed and/or operated by the organization.

Preventing unauthorized access to data traversing an enterprise's single site LAN is relatively straightforward. As long as intelligent network management and adequate physical security are maintained, unauthorized access to the data passing across an enterprise's internal LAN can be prevented. It is when the enterprise spans multiple sites that security threats from the outside become a considerable problem.

For distributed enterprises that wish to communicate data electronically, several options exist but each has associated disadvantages. One option is to interconnect the various offices or sites with dedicated, or private, communication connections, often referred to as leased lines. This is a traditional method used by organizations to implement a wide area network (WAN). The disadvantages of implementing an enterprise-owned and controlled WAN are obvious: they are expensive, cumbersome and frequently underutilized if configured to handle the peak capacity requirements of the enterprise. The obvious advantage is that the lines are dedicated for use by the enterprise and are therefore reasonably secure from eavesdropping or tampering by intermediate third parties.

One alternative to using dedicated communication lines is to exchange data communications over the emerging public network space. For example, in recent years the Internet has evolved from a tool primarily used by scientists and academics into an efficient mechanism for global communications. The Internet provides electronic communication paths between millions of computers by interconnecting the various networks upon which those computers reside. It has become commonplace, even routine, for enterprises (including those in nontechnical fields) to provide Internet access to at least some portion of the computers within the enterprises. For many organizations, Internet access facilitates communications with customers and potential business partners and promotes communications between geographically distributed members of the organization as well.

Distributed enterprises have discovered that the Internet is a convenient mechanism for enabling electronic communications between their members. For example, even remote sites within an enterprise can connect to the Internet through Internet Service Providers (ISP). Once they have access to the Internet, the various members of the enterprise can communicate among the enterprise's distributed sites and with other Internet sites as well. A large disadvantage of using this form of intra-enterprise communications is the general lack of security afforded communications traversing public networks such as the Internet. The route by which a data communication travels from one point on the Internet to another point can vary on a per packet basis, and is therefore essentially indeterminate. Furthermore, the data protocols for transmitting information over the constituent networks of the Internet are widely known, thus leaving electronic communications susceptible to interception and eavesdropping, the danger of which increases as packets are replicated at most intermediate hops. Of potentially greater concern is the fact that communications can be modified in transit or even initiated by or routed to an impostor. With these disconcerting risks, most enterprises are unwilling to subject their proprietary and confidential communications to the exposure of the public network space. For many organizations, it is common to not only have Internet access available at each site, but also to maintain existing dedicated communications paths for internal enterprise communications, with all of the attendant disadvantages described above.

To remedy this problem, organizations have begun to build "virtual private networks" (VPNs) on top of public networks, such as the Internet, to protect data transmitted over public networks. Virtual private network systems often rely on virtual private network units, which may reside on the WAN or LAN side of a routing apparatus to connect an enterprise site to the Internet. Thus, VPN units are in the path of all relevant data traffic between an enterprise site and the public network. To ensure secure data communications between members of the same VPN, a VPN unit implements a combination of techniques for data communication between members of the VPN group. These techniques include various combinations of compression, encryption and authentication, the rules for each of which may vary for members of different groups.

Intelligent communication devices such as encryption and decryption devices described above typically incorporate processors. Processors execute sets of instructions, such as those comprising an operating system program, in order to perform their specified functions. The operating system of an encryption or decryption device, for example, may include instructions detailing the method of encryption or decryption to be applied, identifying how to differentiate between streams of data that are and are not to be encrypted or decrypted, etc. The operating system program executed by a processor is typically updated periodically for a variety of reasons, perhaps to add a new function, enhance efficiency, or to resolve an error in a previous version.

Sometimes, however, a new version of an operating system contains an error, or "bug," that causes a processor and/or its host device to operate incorrectly or inefficiently. A flawed operating system may force a processor to operate so erroneously or erratically as to cause the processor to reboot. Many bugs that detrimentally affect a processor's operation are not discovered until after the new version is installed and the host device fails to operate or operates incorrectly. Replacing the new, flawed, version of the operating system with a previous version known to operate effectively increases the amount of time that the device is out of operation. The longer a communication device is out of operation, the greater the impact upon an organization.

There is, therefore, a need in the art for an intelligent communications device that can be selectively configured to run any of a plurality of operating system programs, which programs are advantageously stored on the device. In addition, there is a need for a method of configuring such a device from a location remote from the device.

SUMMARY

The present invention provides a method and an apparatus for configuring a computer system to selectively operate according to one of a plurality of operating systems, all of which are stored within the device. One embodiment of the present invention is used in a virtual private network operating over a public data network. In this first embodiment, a virtual private network (VPN) unit within the virtual private network contains a processor and multiple storage memories for the storage of operating system programs. The various stored operating system programs may, illustratively, comprise different versions of the same operating system. At any one time, the processor executes instructions corresponding to an operating system program stored in one of the storage memories. The VPN unit further comprises a pointer to the storage memory containing the current operating system program (i.e., the operating system program that will be loaded and executed by the processor the next time the device is booted). The pointer is, however, selectively modifiable to point to a storage memory other than the one containing the current operating system program. By redirecting the pointer, a different operating system program will be loaded the next time the VPN unit is booted.

According to an embodiment of the invention, an operating system program not already stored on the VPN unit is received by the VPN unit as a stream of data through a communication port. The identity of the storage memory containing the current operating system is determined and the new program is stored in a storage memory not containing the current operating system program. In this embodiment, the pointer is automatically modified to identify the storage memory containing the newly received and stored program. The next time the VPN unit is booted, the new operating system program will be loaded and executed by the processor. When a new operating system program is stored in a storage memory, it replaces whatever operating system program, if any, was previously stored therein.

In another embodiment, the interface unit receives a command, from a control station electrically coupled to the VPN unit, to redirect the pointer. In response to this command, the pointer is modified to point to a storage memory other than the storage memory containing the current operating system program.

In yet another embodiment, the VPN unit fails and automatically reboots when a newly installed operating system program is flawed or corrupted. If the unit reboots a specified number of times within a pre-set interval, the pointer is modified to point to the storage memory containing an operating system program that had executed before the newly installed program. Therefore, the next time the VPN unit reboots, the processor will load and execute an operating system program that had executed more effectively than the flawed or corrupted program.

DEFINITIONS

Figure 1:
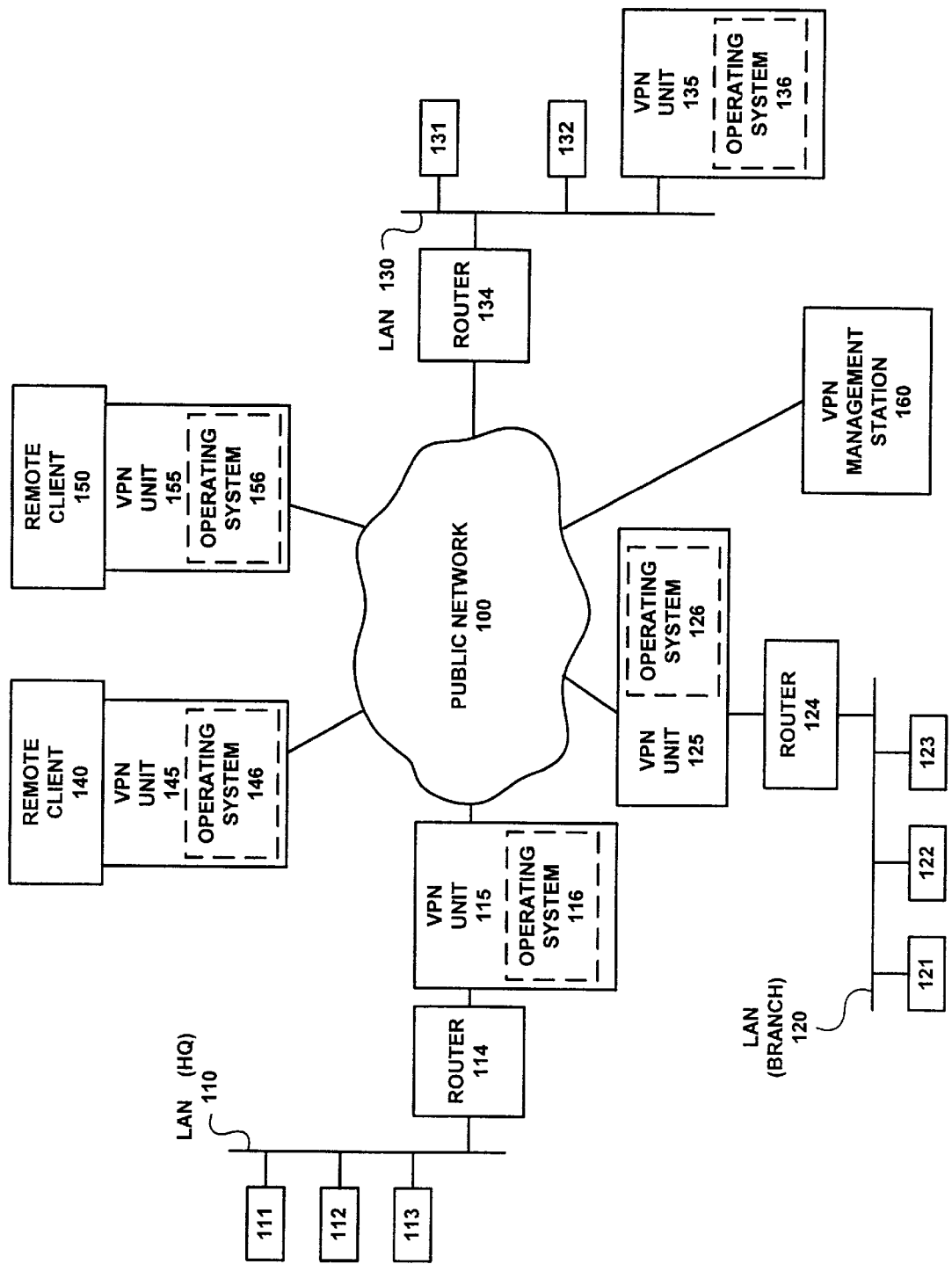
FIG. 1 illustrates a public network 100 including VPN units 115, 125, 135, 145, and 155 operating under control of VPN management station 160 in accordance with an aspect of the present invention.

Configuration Parameters—parameters sent to a VPN unit to configure the VPN unit to appropriately handle communications between members of VPNs.

Group of Nodes—a group of nodes on a public network. In one variation, these nodes belong to the same local network. In another variation, these nodes are specified by at least one net/mask pair.

Local Address—an address on the same enterprise network (or local network), wherein the enterprise network is separated logically or physically from a public data network by a VPN unit.

Local Network—an enterprise network (or a local network) separated logically or physically from a public data network by a VPN unit.

Net/Mask Pair—a specification for a group of network addresses including a network ID and a network address mask.

Network Group—same as group of nodes.

Non-local Address—an address on a different enterprise network (or local network), wherein enterprise networks are separated logically or physically from a public data network by a VPN unit.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. For example, the present invention is described predominantly in terms of utilizing the Internet as a communications medium. However, the concepts discussed herein are broad enough to accomplish the implementation of secure virtual private networks over other public or relatively unsecure communications media. In addition, although the invention is implemented in the form of a virtual private network unit, the concepts and methods of the invention are readily adaptable to communication devices performing other functions.

Throughout this detailed description, numerous specific details are set forth, such as particular encryption or key management protocols, in order to provide a thorough understanding of the present invention. To one skilled in the art, however, it will be understood that the present invention may be practiced without such specific details. In other instances, well-known control structures and system components have not been shown in detail in order not to obscure the present invention.

The present invention is not limited to any one particular implementation technique. Those of ordinary skill in the art will be able to implement the invention with various technologies without undue experimentation once the functionality to be carried out by such components is described. In many instances, components implemented by the present invention are described at an architectural, functional level. Many of the elements may be configured using well-known structures, particularly those designated as relating to various compression or encryption techniques. Additionally, for logic to be included within the system of the present invention, functionality and flow diagrams are described in such a manner that those of ordinary skill in the art will be able to implement the particular methods without undue experimentation. It should also be understood that the techniques of the present invention may be implemented using a variety of technologies. For example, the VPN unit to be described further herein may be implemented in software running on a computer system, or implemented in hardware utilizing either a combination of microprocessors or other specially designed application specific integrated circuits, programmable logic devices, or various combinations thereof.

Description of a Virtual Private Network (VPN)

FIG. 1 illustrates a public network 100, such as the Internet, including VPN units 115, 125, 135, 145, and 155 operating under control of VPN management station 160 in accordance with an embodiment of the present invention. Public network 100 may be any type of communication channel, including, but not limited to, data networks such as the Internet. VPN unit 115 couples headquarters local area network (LAN) 110 to public network 100 through router 114. Headquarters LAN 110 is illustrated with three coupled endstations 111, 112 and 113. Likewise, VPN unit 125 couples branch LAN 120 to public network 100 through router 124. Branch LAN 120 is shown with a plurality of coupled endstations 121, 122 and 123. LAN 130 is coupled to public network 100 through router 134. LAN 130 comprises a plurality of computers, illustratively 131 and 132, for communicating data packets over LAN 130. Note that in LAN 130, VPN unit 135 is not linked directly to both router 134 and network 100, but rather is located on LAN 130. In this configuration, secure communications between LAN 130 and public network 100 are "tunneled" through VPN unit 135. The data communications within headquarters LAN 110, branch LAN 120, LAN 130 and other sites may adhere to any of a wide variety of network protocols, the most common of which are Ethernet and Token Ring.

VPN units 145 and 155 couple remote clients 140 and 150, respectively, to public network 100. Remote clients are systems coupled to public network 100 from remote locations. It is frequently desirable for members of an enterprise who are travelling or working from home or other remote locations to exchange data with other members of the enterprise. Thus, remote clients 140 and 150 may communicate with the headquarters LAN 110 over long distance telephone lines or other point-to-point links. Advantageously, remote clients 140 and 150 may have access to public network 100 through local Internet service providers (ISPs). In one embodiment, VPN units 145 and 155 are implemented as hardware modules. In another embodiment, VPN units 145 and 155 are implemented as software modules within remote clients 140 and 150, respectively.

VPN units 115, 125, 135, 145 and 155 include operating systems 116, 126, 136, 146 and 156, respectively, which control the operation of VPN units 115, 125, 135, 145 and 155. An illustrative internal structure of VPN unit 115 is described in more detail below with reference to FIG. 4. The internal structure of an illustrative operating system is described in detail below with reference to FIG. 7.

VPN management station 160 controls VPN units 115, 125 and 135 through commands and configuration information transmitted to the respective VPN unit through public network 100. VPN management station 160 may be implemented in software running on a computer system, or alternatively may be implemented in hardware utilizing a combination of microprocessors or other specially designed application specific integrated circuits, programmable logic devices, or various combinations thereof. The structure of VPN management station 160 is described in more detail below with reference to FIGS. 9 and 10.

LANs for the particular sites illustrated in FIG. 1 connect to public network 100 through associated routing or gateway devices, which are identified as routers 114, 124 and 134, respectively. Data packets conveyed between the various sites illustrated in FIG. 1 generally traverse a plurality of additional routing devices on their way between the source and destination sites for the packets. The mechanisms for data packet transfers over a public network 100, such as the Internet, are well known and are not described in great detail herein. In one embodiment, packets are assembled in accordance with the Internet Protocol (IP) and are referred to herein as IP packets regardless of the version of the protocol presently in effect.

The placement of the various VPN units in the overall system architecture illustrated in FIG. 1 represents only one placement scheme. Other configurations are possible. The only requirement is that data traffic is routed through the VPN units. In another embodiment, multiple VPN units are located on an individual LAN.

VPN units maintain lookup tables for identifying members of specific virtual private network groups. When a data packet is sent between source and destination addresses that are both members of the same VPN, the VPN unit processes the data packet from the sending side ensuring that it is compressed, if necessary, properly encrypted, and that authentication information is added to it. Likewise, the receiving VPN unit servicing the destination site will detect that a packet is being propagated between members of the same VPN. The receiving VPN unit authenticates, decrypts and decompresses the packet (if necessary) before forwarding it toward the destination endstation. In this way, secure data communications between end users are achieved in a manner that is transparent to the end users. As described above, in the case of remote clients 140 and 150, VPN units 145 and 155 may be implemented in software, which operates in conjunction with the communication software for connecting the remote client to its associated Internet Service Provider (ISP).

Figure 2:
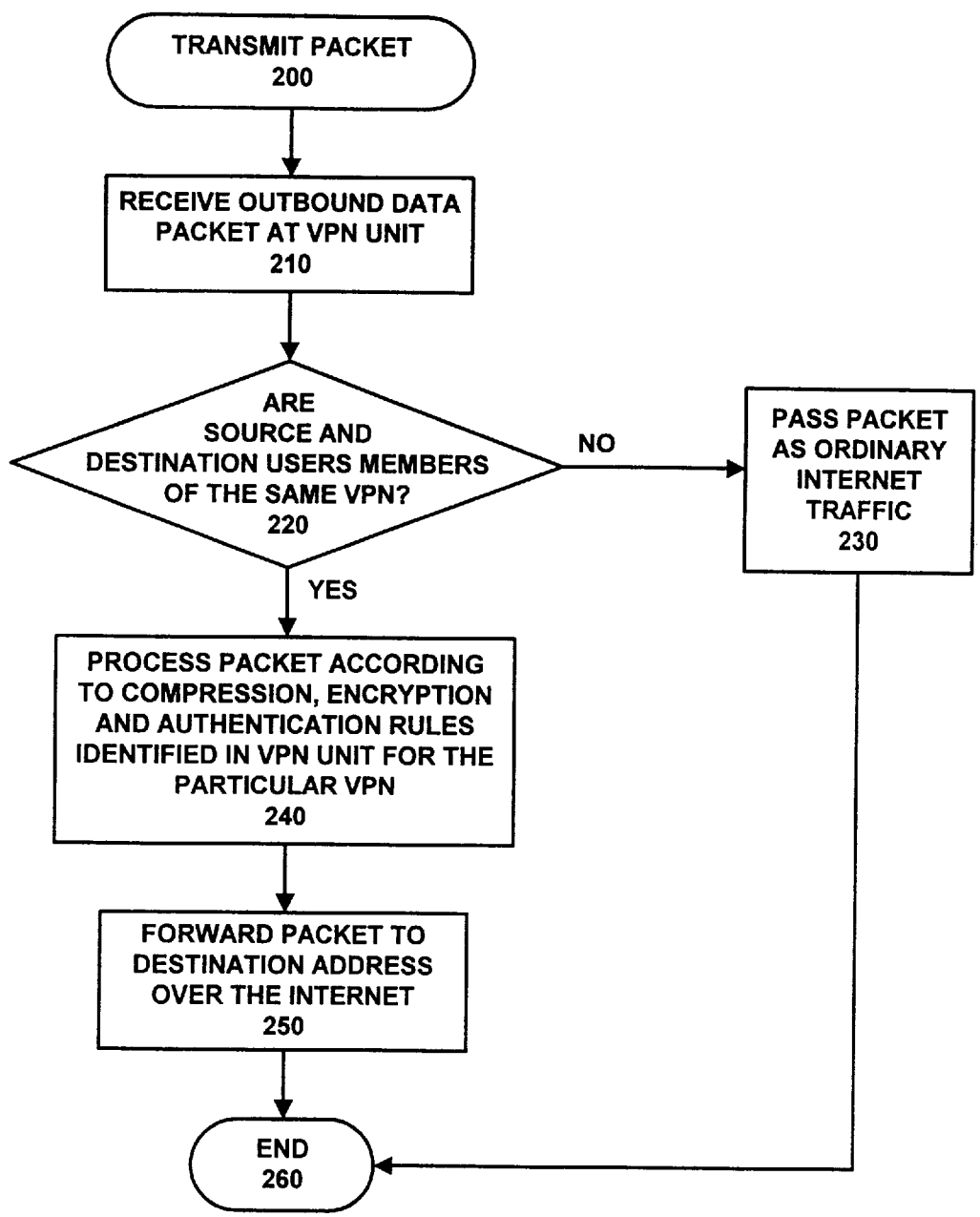
FIG. 2 is a flow chart illustrating the processing of a packet being transmitted from one member of a VPN to another member of the VPN over a public data network in accordance with an aspect of the present invention.

FIG. 2 is a flow chart illustrating the processing of a packet being transmitted from one member of a VPN to another member of the same VPN over a public data network in accordance with an embodiment of the present invention. When a data packet originates from an endstation, such as endstation 112 of LAN 110, and is destined for a remote site outside of LAN 110, the packet is initially treated as an ordinary Internet data packet. The packet proceeds from endstation 112 over LAN 110 to router 114, which encapsulates the data packet in accordance with the active Internet Protocol, thereby forming an outbound IP packet. On its way out of the site, the IP packet passes through the associated VPN unit 115 for the site.

In FIG. 2, the illustrated transmit procedure 200 begins when the outbound data packet is received at the transmitting endstation's VPN unit in state 210. At decision box 220, the system determines whether or not the source and destination addresses for the data packet are both members of the same VPN. This determination may be made with reference to lookup tables that are maintained by the VPN unit or by reference to other memory mechanisms. This state may be seen as filtering data packets being transmitted between a particular site and the VPN unit that services it. If the source and destination address for the data packet are not members of the same VPN, then in state 230 the packet is forwarded to the Internet as ordinary Internet traffic, as though the VPN unit were not involved. In this case, the system proceeds to state 260, which is an end state. In an alternative embodiment, the system discards data traffic that is not between members of a VPN, rather than forwarding it as unsecure traffic. In another embodiment, the system provides the option to either forward or discard data traffic that is not being passed between members of the same VPN.

If, at decision box 220, the system determines that both the source and destination addresses for the data packet are members of the same VPN, the data packet is processed at state 240 in order to effect various combinations of compression, encryption and authentication. Lookup tables maintained by the VPN units identify members of individual VPNs. The tables additionally identify whether or not data packets transferred between members of a particular VPN are to be compressed and, if so, the compression algorithm to be used. Many compression algorithms are known, but in one embodiment of the invention LZW compression is used. The lookup table entry associated with the VPN of which the source and destination addresses are members also identifies the particular encryption algorithm to be used for data packets transiting the VPN. The lookup table additionally identifies the authentication and the key management protocol information which is used. As an alternative to lookup tables, VPN units may be programmed to use the same algorithms for all VPNs.

The particular packet processing algorithms to be used for VPN traffic may vary, so long as the lookup tables in both the sending and receiving VPN units identify the same compression, encryption and authentication rules and are capable of implementing them for members of the same group.

If a packet is received from a remote client that is not currently authenticated, the system attempts to authenticate the remote client before forwarding traffic from that client. If authentication is successful, the system dynamically retrieves configuration information for the remote client from a database and further traffic from that client will be processed according to the retrieved configuration information.

Note that a single VPN unit may serve multiple VPNs, and that one network address may be a member of multiple VPNs. Thus, in state 240, a packet dispatched from one member of a specific VPN to another member is processed according to the compression, encryption and authentication rules identified in the VPN unit tables for that particular VPN. Then, in state 250, the processed packet is forwarded toward the destination address over the public data network. The sending procedure ends at state 260.

Figure 3:
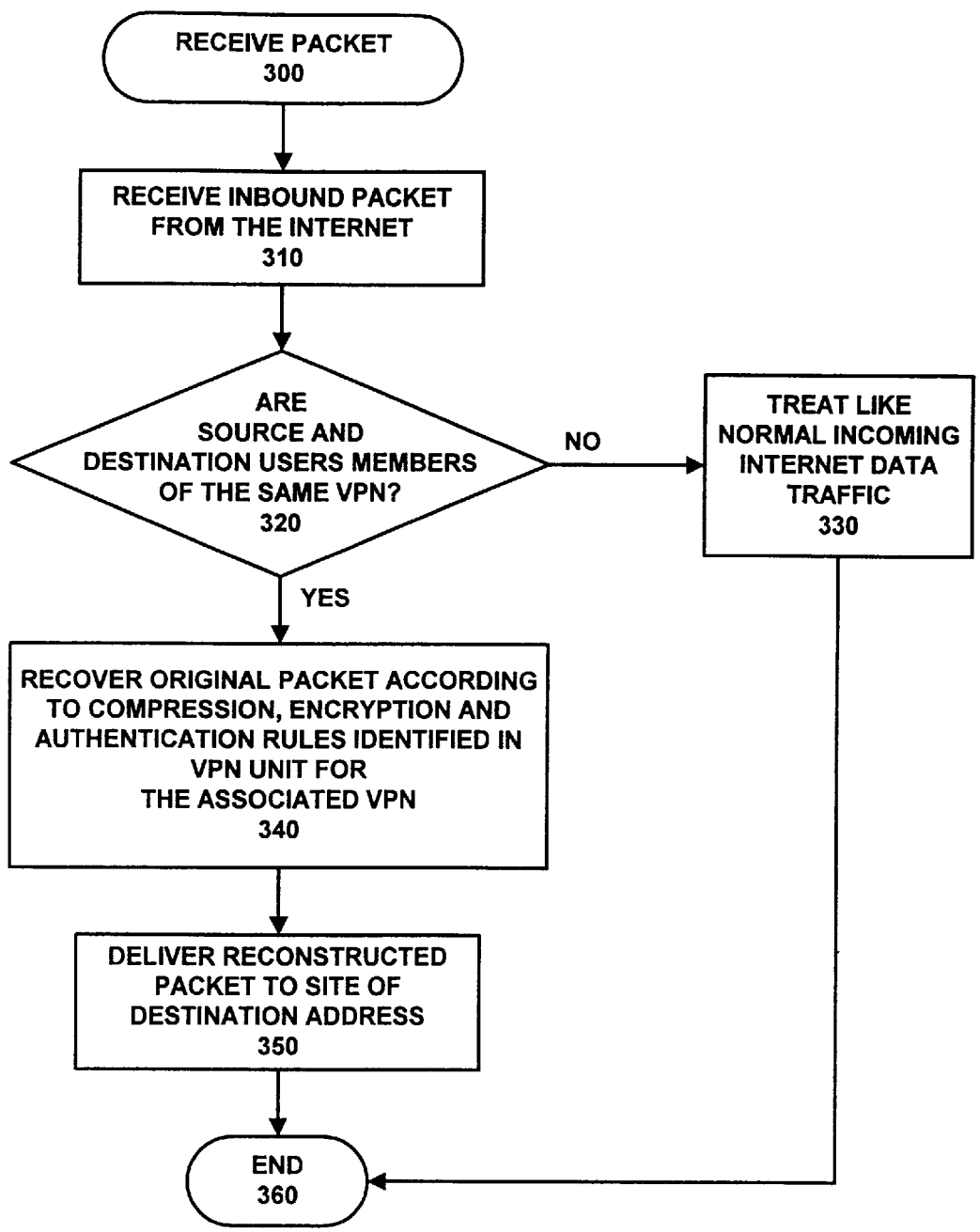
FIG. 3 is a flow chart illustrating the processing of a packet being received over a public data network by one member of a VPN from another member of the VPN in accordance with an aspect of the present invention.

FIG. 3 is a flow chart illustrating the processing of a packet received over a public data network in accordance with an embodiment of the present invention. This packet reception procedure 300 begins at state 310 when an inbound data packet is received from the Internet at the receiving VPN unit. At decision box 320, the inbound data packet is examined to determine if the source and destination addresses of the data packet correspond to members of the same VPN. (It is assumed that the lookup tables maintained by all of the VPN units are consistent, i.e., that the tables within each VPN unit report the same membership for each VPN.) If the inbound data packet is determined not to be VPN traffic, then in state 330 the packet is passed through and forwarded to the receiving site as though it were normal Internet data traffic. The system then proceeds to state 360, which is an end state. In an alternative embodiment, the system discards incoming data traffic that is not from a member of a VPN supported by the VPN unit. In another embodiment, the system provides the option to either forward or discard data traffic that is not being passed between members of the same VPN.

For data packets that are determined to be VPN traffic at decision box 320, the VPN unit processes the inbound packet to recover the original data packet as it was provided from the source endstation. In state 340, the lookup table maintained by the receiving VPN unit identifies the compression, encryption and authentication rules used for the VPN and then reconstructs the original IP packet in accordance with those rules. Then, in state 350, the reconstructed packet is delivered to the site of the destination address. The system then proceeds to state 360, which is an end state.

Description of a VPN Unit

Figure 4:
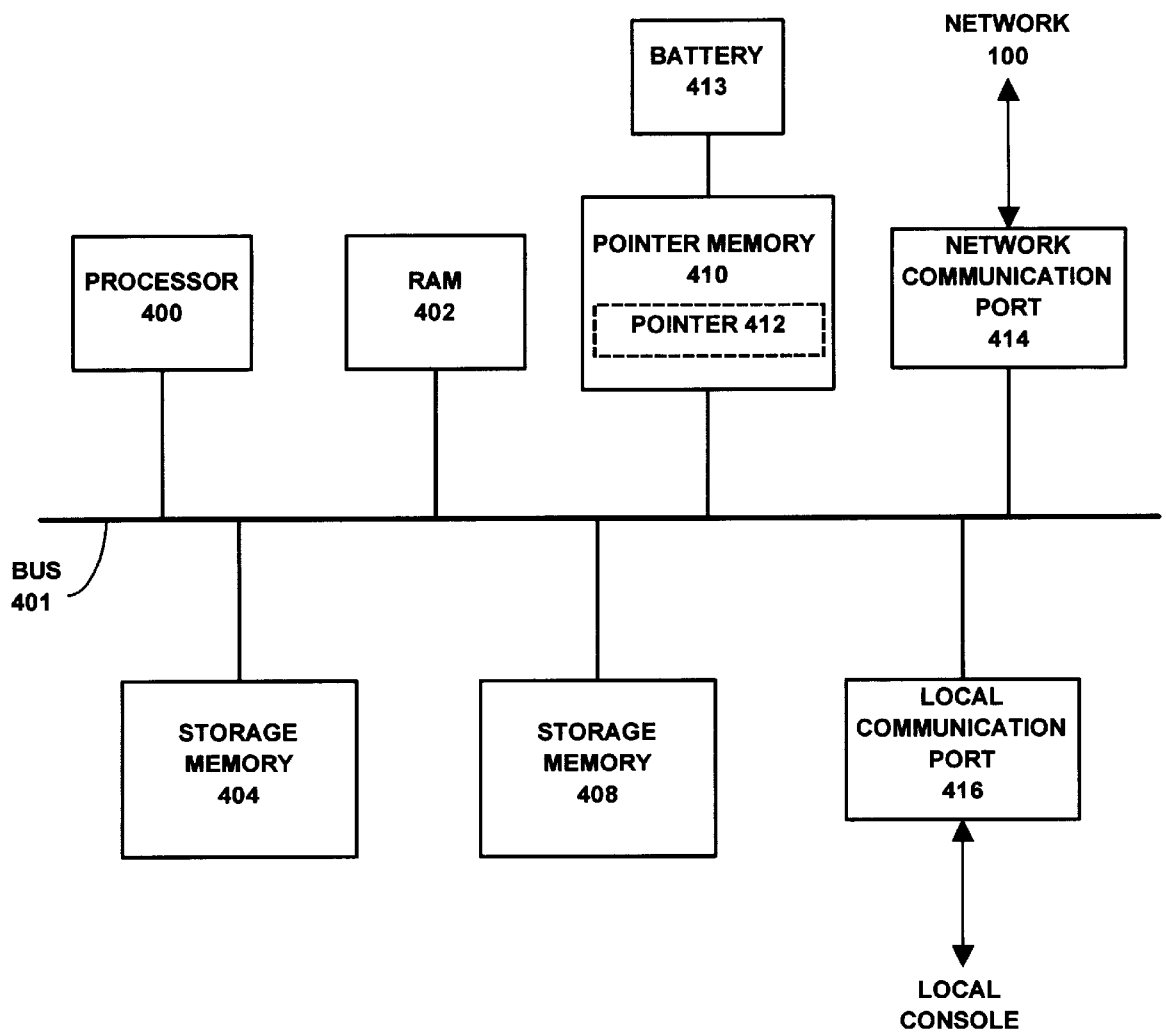
FIG. 4 is a block diagram illustrating a portion of the internal structure of VPN unit 115 from FIG. 1 in accordance with an aspect of the present invention.

FIG. 4 is a block diagram illustrating a portion of the internal structure of VPN unit 115 according to an embodiment of the present invention. It is understood that the layout depicted in FIG. 4 is illustrative and does not limit the scope of the invention.

VPN unit 115 includes processor 400, which is coupled to RAM 402, for executing instructions stored in RAM 402. VPN unit 115 further includes storage memories 404, 408, which take the form of non-volatile flash PROMs in one embodiment of the invention. The internal structures of storage memory 404 and storage memory 408 are described below in conjunction with FIGS. 5 and 6, respectively. VPN unit 115 also includes pointer memory 410, network communication port 414, local communication port 416, and bus

401 for communicating between the various components of VPN unit 115. Pointer memory 410 includes pointer 412 and other data as described below. In a present embodiment of the invention, pointer memory 410 is coupled to battery 413 in order to preserve the contents of pointer memory 410 in the event of the loss of power to VPN unit 115.

Figure 5:
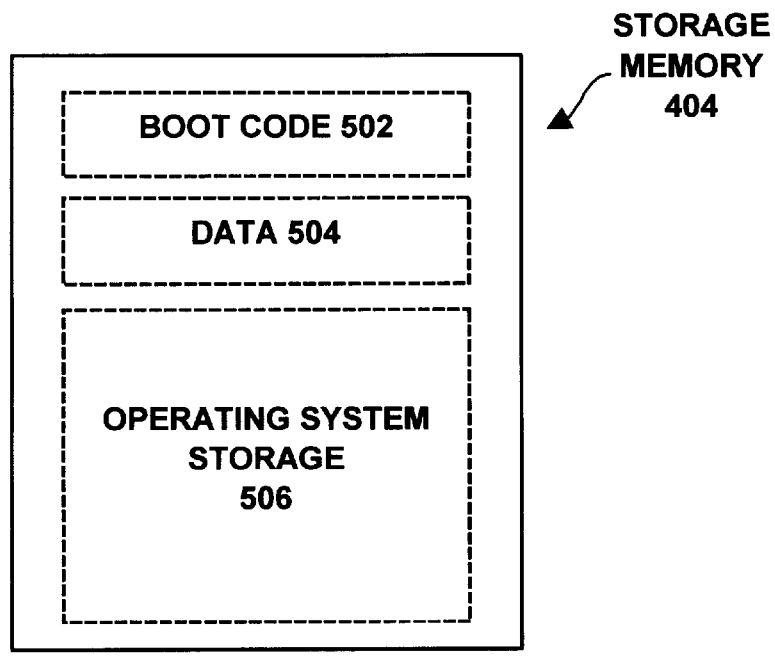
FIG. 5 is a block diagram illustrating the configuration of a first storage memory from FIG. 4 in accordance with an aspect of the present invention.

With reference now to FIG. 5, the internal structure of storage memory 404 is shown. Storage memory 404 illustratively includes boot code 502, data 504, and operating system storage 506. Upon initializing, booting or rebooting VPN unit 115, boot code 502 is loaded into RAM 402 for execution by processor 400. VPN unit 115 may, for example, be rebooted in response to a command received from a local console through local communication port 416 or a command received from VPN management station 160 (from FIG. 1) through network communication port 414. VPN unit 115 may also be booted when power is restored after a preceding loss of power.

Data 504 includes certification data for authenticating VPN unit 115 to VPN management station 160. When VPN unit 115 is to be configured by VPN management station 160, as described below, VPN unit 115 and VPN management station 160 authenticate themselves to each other. This dual authentication process prevents an impostor from masquerading as one or the other and thereby corrupting VPN unit 115 or another element of a virtual private network.

Operating system storage 506 is configured to store an operating system program for directing the operation of processor 400. The contents of operating system storage 506 are replaceable, such that one operating system program may be stored in place of another operating system program that had been previously stored in operating system storage 506.

Figure 6:
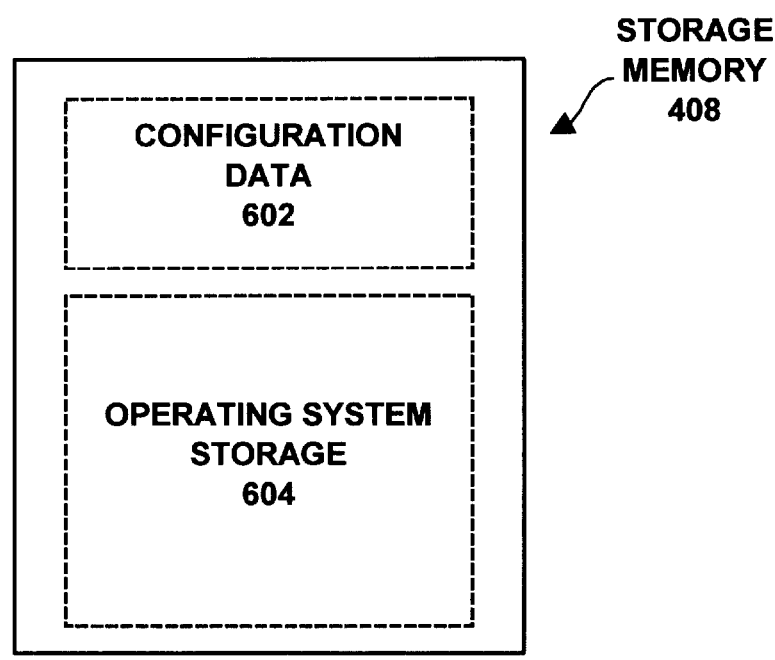
FIG. 6 is a block diagram illustrating the configuration of a second storage memory from FIG. 4 in accordance with an aspect of the present invention.

With reference to FIG. 6, storage memory 408 illustratively includes configuration data 602 and alternate operating system storage 604. Configuration data includes information used to operate VPN unit 115, such as: an IP address of the unit, IP addresses of VPN endstations that will be transmitting data through the unit, the encryption algorithm to be used, the authentication algorithm to be used, whether or not to compress data transmitted through the unit, SNMP (Simple Network Management Protocol) data used to manage the unit (e.g., name and physical description of VPN unit 115), etc. The contents of configuration data 602 are, in one embodiment of the invention, updated when VPN unit 115 is configured or reconfigured by VPN management station 160.

Operating system storage 604 is similar to operating system storage 506 in that it is also configured to store an operating system program that may be loaded and executed by processor 400. In a present embodiment of the invention, one operating system program is stored in operating system storage 506 and one in operating system storage 602. In an alternative embodiment of the invention, however, VPN unit 115 is not limited to two storage memories. In a further alternative embodiment, a storage memory within VPN unit 115 is capable of storing a plurality of operating system programs.

Returning now to FIG. 4, after executing boot code 502 retrieved from storage memory 404, processor 400 loads (into RAM 402) and executes instructions according to an operating system program from either of storage memories 404, 408. The storage memory from which an operating system program is to be retrieved the next time VPN unit 115 is booted is identified by pointer 412, which is stored in pointer memory 410. Therefore, pointer 412 usually identifies the storage memory from which the currently executing operating system program was retrieved.

The contents of pointer 412 may, however, be modified during the operation of VPN unit 115 so that pointer 412 identifies the storage memory 404, 408 other than the storage memory 404, 408 from which the currently executing operating system was loaded. For example, assume that VPN unit 115 has been rebooted and processor 400 loaded an operating system program from storage memory 404. At that time, pointer 412 will identify storage memory 404. At some time after being rebooted, pointer 412 may be redirected so as to identify storage memory 408. In one embodiment of the invention, pointer 412 is redirected in response to a command received through local communication port 416 from a local console. In another embodiment, pointer 412 is redirected in response to a command from VPN management station 160.

Advantageously, redirecting pointer 412 allows VPN unit 115 to be rebooted and operated under an operating system program different than the program that was executed prior to rebooting VPN unit 115. It will be apparent to one of skill in the art that only one operating system program need be stored on VPN unit 115 in order for VPN unit 115 to operate effectively, which program may be stored in either storage memory 404 or storage memory 408.

In yet another embodiment, a counter in pointer memory 410 counts the number of times VPN unit 115 is rebooted since the installation of a new operating system program in either of storage memory 404 or storage memory 408. As described below in conjunction with FIG. 8, VPN unit 115 is typically rebooted after it installs a new operating system program, in order to run according to the new operating system program. VPN unit 115 may reboot after this post-installation reboot because the new program is flawed or corrupted. Such a reboot may occur automatically or in response to a command from VPN management station 160. If VPN unit 115 reboots a preset number of times within a predetermined period of time after a new operating system program is installed (e.g., 3 times in 5 minutes), pointer 412 is automatically modified to point to the storage memory in which the previously executed operating system program is stored.

In an embodiment of the present invention, pointer memory 410 also stores some of the contents of configuration data 602 (shown in FIG. 6) of storage memory 408. Illustratively, when VPN unit 115 is configured or reconfigured by VPN management station 160, portions of configuration data 602 essential to the continued operation of VPN unit 115 (e.g., the IP address of VPN unit 115, default route for communicating with the VPN management station) are copied into pointer memory 410. Doing so helps ensure the continued operation of VPN unit 115 during the configuration or reconfiguration process.

Description of a VPN Unit Operating System

Figure 7:
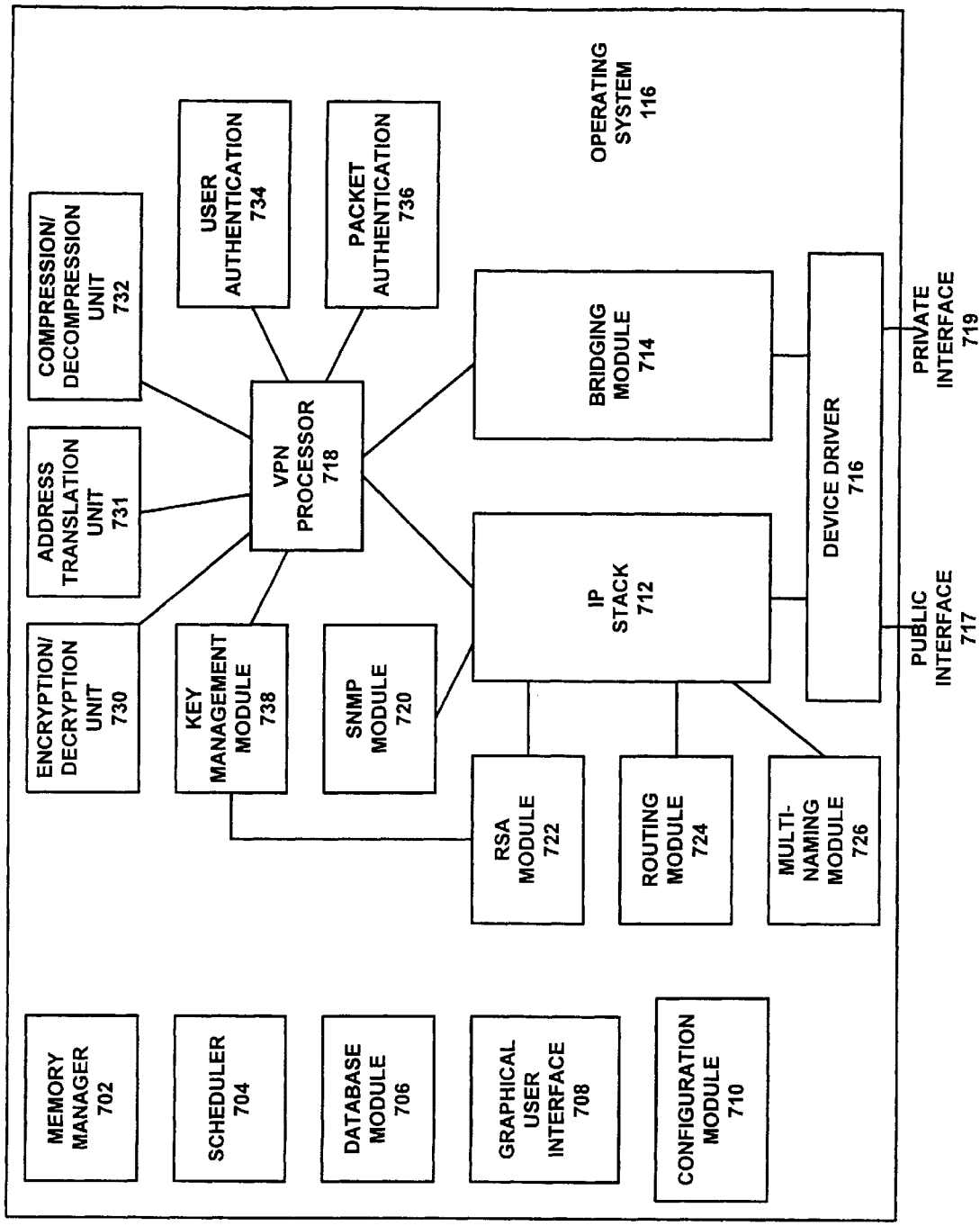
FIG. 7 is a block diagram of operating system 116 from FIG. 1 in accordance with an aspect of the present invention.

FIG. 7 is a block diagram of operating system 116 (from FIG. 1) which provides the instructions for operating VPN unit 115 in accordance with an aspect of the present invention. Operating system 116 includes a number of modules, the most central of which is VPN processor 718, which controls the operation of operating system 116.

In the illustrated embodiment, VPN processor 718 communicates with a number of modules, including IP stack 712 and bridging module 714. IP stack 712 and bridging module are coupled through device driver 716 to private interface 719 and public interface 717. Public interface 717 is coupled to a public network, such as public network 100 from FIG. 1. Private interface 719 is coupled to a private network, such as LAN 110 from FIG. 1. One function of operating system 116 is to filter and manipulate communications between public network 100 and LAN 110. Device driver 716 facilitates communications with public interface 717 and private interface 719. In one embodiment, device driver 716 facilitates communications using the 10-BASE-T protocol.

Bridging module 714 provides a logical connection between private interface 719 and public interface 717. In one embodiment, bridging module 714 provides this connection by supporting level two bridging of medium access control (MAC) addresses. Note that bridging operations are selectively controlled by VPN processor 718 so that communications within a VPN are encrypted before being transmitted across public network 100.

IP stack 712 handles the protocol layers involved in translating communications from public interface 717 and private interface 719 into a form suitable for manipulation by VPN processor 718. A number of modules are coupled to IP stack 712, including multi-naming module 726, routing module 724, RSA module 722, and SNMP module 720. Multi-naming module 726 provides multiple Internet Protocol (IP) addresses for VPN unit 115 (from FIG. 1), which is controlled by operating system 116. Routing module 724 performs standard network routing functions for VPN unit 115. More specifically, routing module 724 determines where messages should be forwarded to in their journey to their ultimate destination. RSA module 722 provides public key/private key security functions, including exchanging of certificates for authentication functions with remote entities. Among its other functions, RSA module 722 supports management of encryption keys and loading of configuration information into VPN unit 115 from VPN management station 160 (from FIG. 1). To this end, RSA module 722 communicates with key management module 738, which itself communicates with VPN processor 718. Key management module 738 sets up keys for encryption and authentication functions. Simple Network Management Protocol (SNMP) module 720 gathers information and statistics from IP stack 712 that a system administrator might be interested in, such as communication traffic statistics.

VPN processor 718 is additionally coupled to other modules, including encryption-decryption unit 730, address translation unit 731, compression-decompression unit 732, user authentication module 734 and packet authentication module 736.

Encryption-decryption unit 730 encrypts and decrypts communications sent and received through public interface 717. In one embodiment, encryption-decryption unit 730 includes an application specific integrated circuit (ASIC) that performs the encryption and decryption operations.

Address translation unit 731 supports translation from private addresses to public addresses, so that communications on LAN 110 can be converted into a form suitable for transmission across public network 100. More specifically, address translation unit 731 supports static translation, dynamic translation and port translation. In order to perform these functions, address translation unit 731 includes pointers from IP stack 712, bridging module 714 and VPN processor 718. In one embodiment, address translation unit 731 additionally implements access control functions that specify the types of communications that are allowed to pass through host VPN unit 115.

Compression-decompression unit 732 provides compression and decompression functions for data sent across public network 100. In one embodiment, compression-decompression unit 732 includes special-purpose hardware to perform the compression and decompression functions.

User authentication module 734 authenticates system users, whereas packet authentication module 736 authenticates individual packets.

Configuration module 710 is coupled to a number of functional units within operating system 116. It facilitates the loading of configuration information from VPN management station 160 (from FIG. 1) and/or the reporting of configuration information to VPN management station 160. Configuration information illustratively includes information specifying how to implement the VPNs defined by the system (e.g., the applicable encryption, compression and authentication algorithms), the operating system in use on VPN unit 115, etc.

Additionally, a number of operating system functions are performed by other modules within operating system 116. Memory manager 702 performs memory management functions. Scheduler 704 schedules tasks within operating system 116. Database module 706 stores configuration and other information for operating system 116. Graphical user interface module 708 facilitates communication with a user of VPN unit 115. The above-listed modules for performing operating system functions are widely used by other modules within operating system 116.

Configuring a VPN Unit

As described above, configuration module 710 of operating system 116 manages the configuration of VPN unit 115 in response to configuration requests or commands from VPN management station 160. It also reports configuration status information concerning host VPN unit 115 to VPN management station 160. Configuration requests handled by configuration module 710 illustratively include requests to: install a new operating system program; configure a VPN (e.g., set up a new VPN, edit an existing VPN, delete a VPN); change an encryption, authentication or compression algorithm; store a static route configuration; store or edit a lookup table; reboot the host VPN unit; etc.

In an embodiment of the present invention, configuration module 710 functions as a background process executed by processor 400 (from FIG. 4) of VPN unit 115. In this embodiment, configuration module 710 monitors network communication port 414 of VPN unit 115 to detect configuration requests sent by VPN management station 160. Configuration module 710 temporarily stores the contents of configuration requests into RAM 402 as the requests are received. At the end of a pre-specified period of time (e.g., 30 seconds), the new or altered configuration data is stored in long-term storage memory (e.g., configuration data storage 602 in storage memory 408, from FIG. 6). As described above, essential configuration data may also be stored in other memory (e.g., pointer memory 410 in FIG. 4) for redundancy and continuity of operation.

Figure 8:
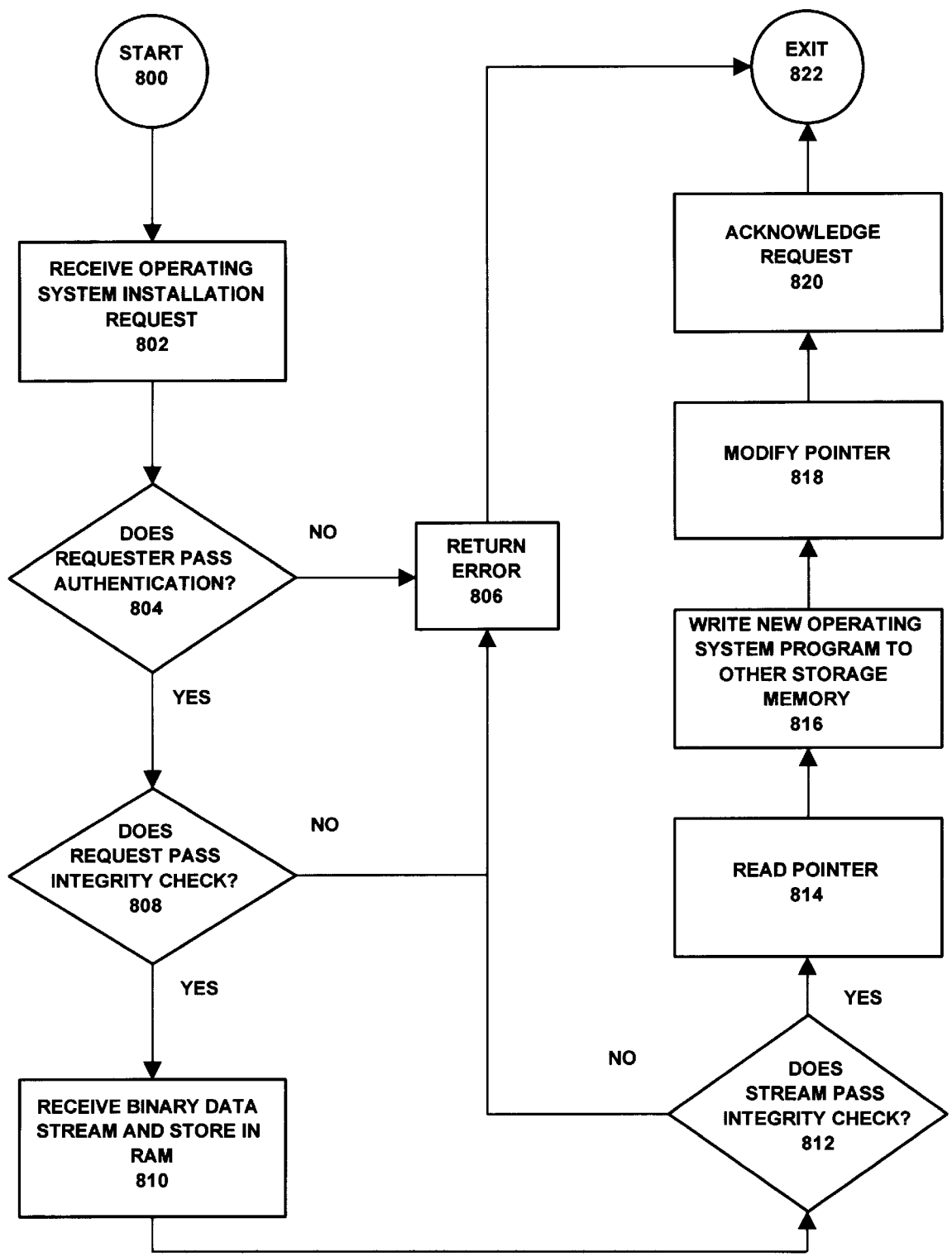
FIG. 8 is a flow chart illustrating some of the operations performed by VPN unit 115 during the installation of a new operating system program in accordance with an aspect of the present invention.

FIG. 8 depicts an illustrative procedure in which configuration module 710 of operating system 116 installs a new operating system program on VPN unit 115. Installing a new operating system is but one type of configuration request handled by configuration module 710. As described above in conjunction with FIG. 4, a new operating system program may be stored in either storage memory 404 or storage memory 408 (from FIG. 4). However, according to a present embodiment of the invention, a new operating system program is stored in whichever of storage memories 404, 408 is not identified by pointer 412 (from FIG. 4). As described above, pointer 412 usually identifies the storage memory containing the operating system program that is currently executing. In this embodiment of the invention, pointer 412 is automatically modified when a new operating system program is installed on VPN unit 115. Therefore, the currently executed operating system program is retained in whichever storage memory it is presently stored, and the new operating system program is stored in another storage memory, thereby replacing any previous operating system program that may have been stored there.

The process commences with start state 800. In state 802 a configuration request ordering the installation of a new operating system is received from VPN management station 160. The configuration request is illustratively received through network communication port 414 (from FIG. 4). In state 804 configuration module 710 authenticates the identity of VPN management station 160 in order to ensure the security and integrity of VPN unit 115. Certification data retrieved from data 504 (from FIG. 5) in storage memory 404 is applied in the authentication effort. If the authentication process fails in state 804, the configuration module applies error state 806, indicating that a fatal error occurred, and exits at state 822.

If the authentication process succeeds in state 804, then in state 808 the integrity of the request is verified. If the request fails the integrity check, error state 806 is applied, VPN management station 160 is informed of the error, and the procedure exits at state 822.

If the operating system installation request passes the integrity test of state 808, then in state 810 the new operating system program is received as a stream of binary data through network communication port 414 and is stored in RAM 402. The integrity of the data stream is then tested in state 812. If the data stream integrity test fails, error state 806 is applied, VPN management station 160 is informed of the error, and the procedure exits at state 822.

When a data stream's integrity is verified in state 812, the configuration procedure proceeds to state 814 in which pointer 412 is read to determine which of storage memories 404, 408 the currently executing operating system program is stored in. In state 816 the new operating system program is stored in the other of storage memories 404, 408, thereby overwriting any operating system program that may have been stored there previously. Pointer 412 is then modified in state 818 to point to the storage memory in which the new program was stored.

As an illustrative example, assume that storage memory 404 contains the operating system program being executed when the configuration request is received. Unless changed by some other procedure, when it is read in state 814, pointer 412 will identify storage memory 404. The new program will then be stored in storage memory 408 in state 816, and pointer 412 will be modified to identify storage memory 408 in state 818.

After successful installation of a new operating system program, the configuration request is acknowledged in state 820 and the procedure exits in state 822.

Description of a VPN Management Station

Figure 9:
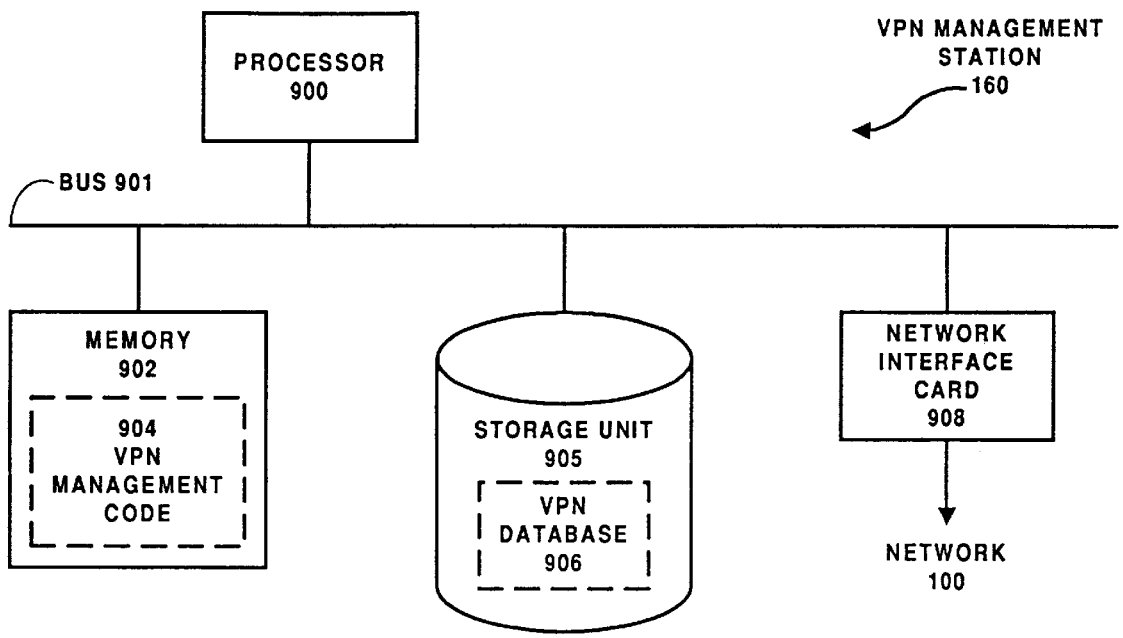
FIG. 9 is a block diagram illustrating part of the internal structure of VPN management station 160 from FIG. 1 in accordance with an aspect of the present invention.

FIG. 9 is a block diagram illustrating part of the internal structure of VPN management station 160 in accordance with an embodiment of the present invention. In general, VPN management station 160 may be any type of computational system coupled to public network 100. In the embodiment illustrated in FIG. 9, VPN management station 160 includes processor 900 coupled to memory 902, storage unit 905 and network interface card 908 through bus 901. Memory 902 includes VPN management code 904 which contains instructions and data to manage VPN units coupled to network 100. Storage unit 905 includes database 906 which includes information reflecting the structure of virtual private networks supported by the system and the configuration of the VPN units supported by VPN management station 160. Network interface card 908 couples VPN management station 160 to network 100. The operations performed by VPN management station 160 are discussed in more detail below.

Figure 10:
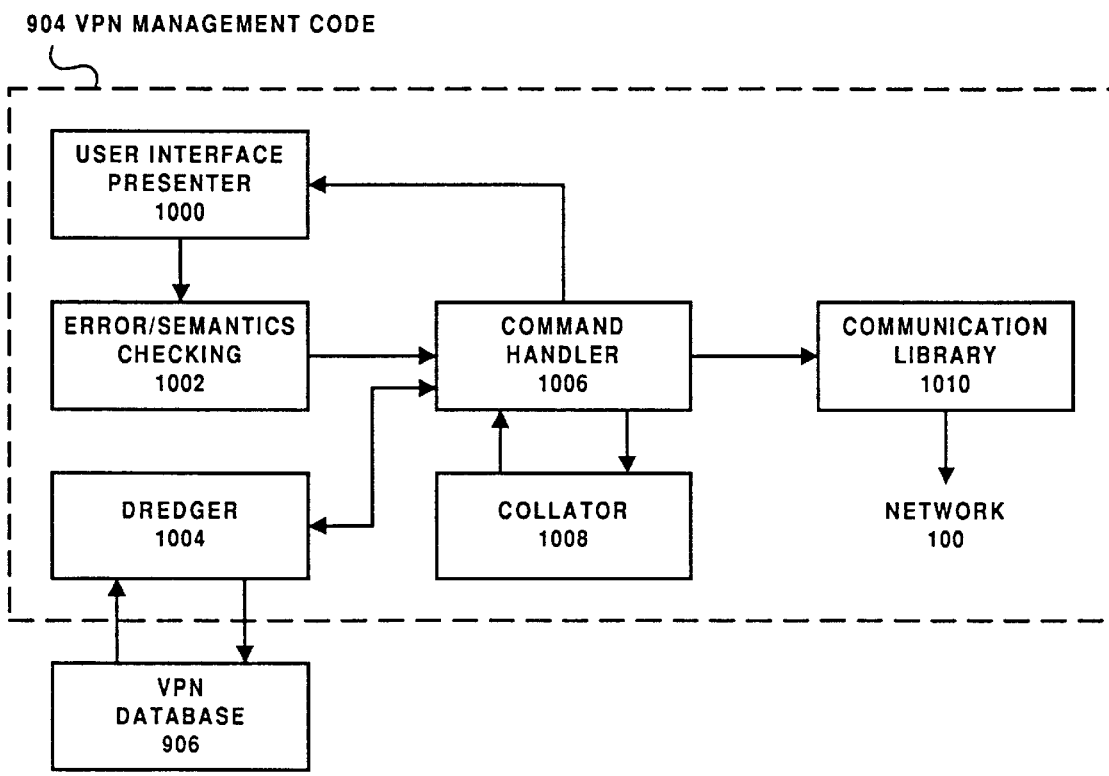
FIG. 10 is a block diagram of the software architecture contained within VPN management station 160 from FIG. 1 in accordance with an aspect of the present invention.

FIG. 10 is a block diagram of part of the software architecture employed by VPN management station 160 in accordance with an embodiment of the present invention. As noted above, VPN management station 160 includes VPN management code 904 in memory 902 and VPN database 906 on storage unit 905. VPN management code 904 includes user interface presenter 1000 which receives input from a system user. This input feeds through error/semantics checking module 1002 before feeding into command handler 1006. Command handler 1006 is coupled to dredger 1004, collator 1008 and communication library 1010. Command handler 1006 executes the commands received through user interface presenter 1000 by manipulating dredger 1004, collator 1008 and communication library 1010. Dredger 1004 is coupled to and performs searches of and updates to VPN database 906. Communication library 1010 contains functions to communicate with network 100. Collator 1008 sorts and manipulates network addresses to produce configuration information for VPN units.

During operation, the system outlined in FIG. 10 operates as follows. A system user inputs a command into user interface presenter 1000. This command feeds through error/semantics checker module 1002 before arriving at command handler 1006. Command handler 1006 may present additional screens or queries to the user through user interface presenter 1000. Command handler then retrieves information regarding the groups of nodes, VPNs and VPN units affected by the command. Command handler 1006 takes this information and uses it to produce configuration information for VPN units using collator 1008. Using functions from communication library 1010, the configuration information is communicated to the VPN units across network 100.

Figure 11:
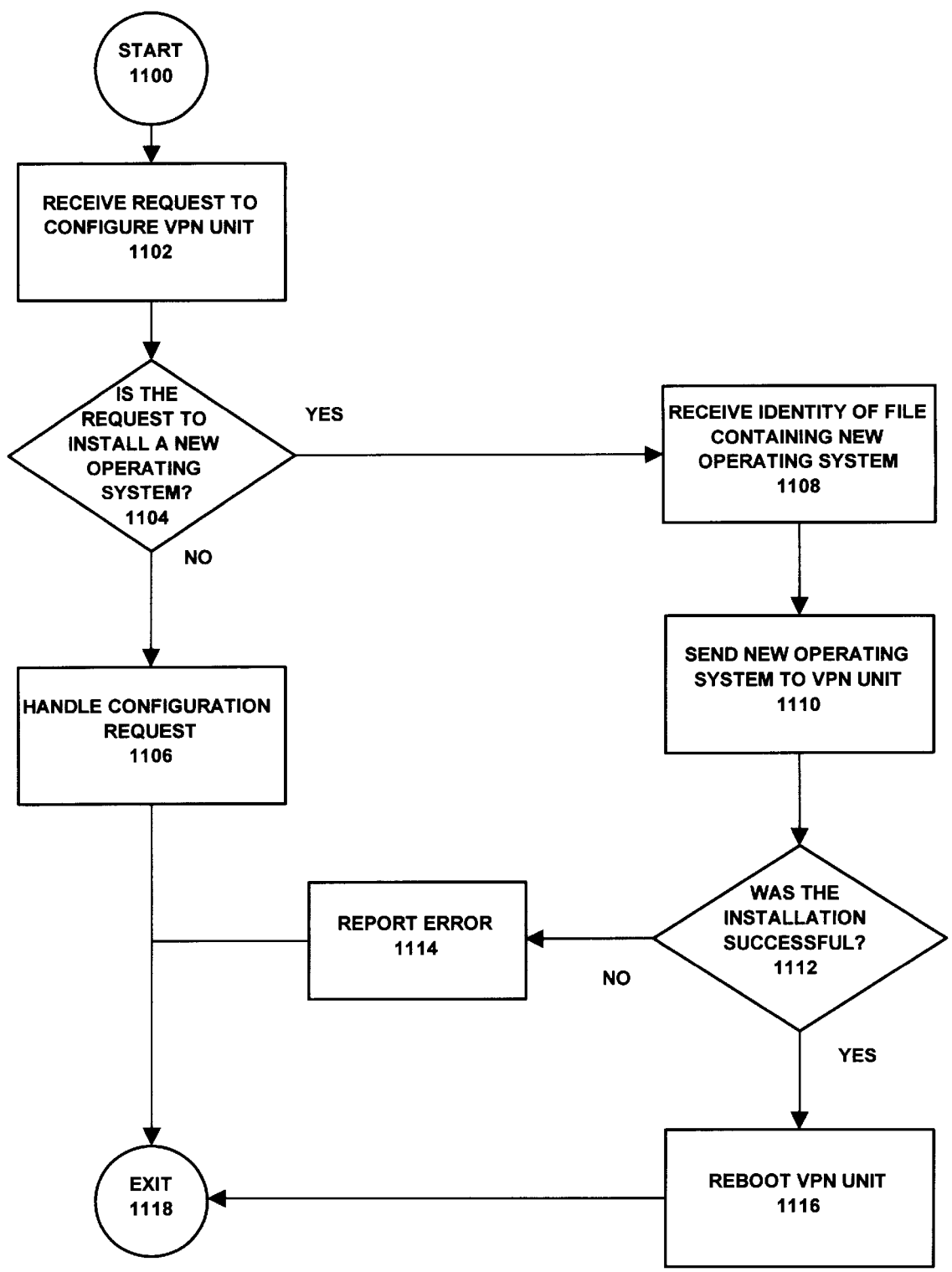
FIG. 11 is a flow chart illustrating some of the operations performed by VPN management station 160 during the installation of a new operating system program on a VPN unit in accordance with an aspect of the present invention.

One function of VPN management station 160 is to manage the configuration of VPN units, such as VPN unit 115, through the issuance of configuration requests. FIG. 11 depicts an illustrative procedure for issuing a configuration request to install a new VPN unit operating system program on VPN unit 115. The procedure commences with state 1100. In state 1102 a request is received, illustratively from a user, to alter the configuration of VPN unit 115. VPN management station 160 examines the request in state 1104. If the request does not involve installation of a new operating system, the request is handled in state 1106 after which the procedure exits in state 1118.

If the request is determined to be a request to install a new operating system, the identity of a file containing the new operating system is received in state 1108. In one embodiment of the invention, VPN management station prompts a user in state 1108 for the name of the file. Then, in state 1110, a stream of data comprising the contents of the identified file is transmitted to VPN unit 115. Sometime after sending the stream of data, a response is received from VPN unit 115. VPN management station examines the response in state 1112 to determine whether the new operating system program was successfully installed or an error occurred.

If, in state 1112, an error was reported, an error message is returned to the user in state 114 and the procedure exits in state 1118. If, however, an acknowledgement of success was reported in state 1112, then a reboot command is issued to VPN unit 115 in state 116 and the procedure exits in state 1118. Alternatively, the user may, in state 1116 be given the option to reboot VPN unit 115 at a later time. As described above, when VPN unit 115 is rebooted, it will execute the newly installed operating system program.

Description of High Level Objects

Figure 12:
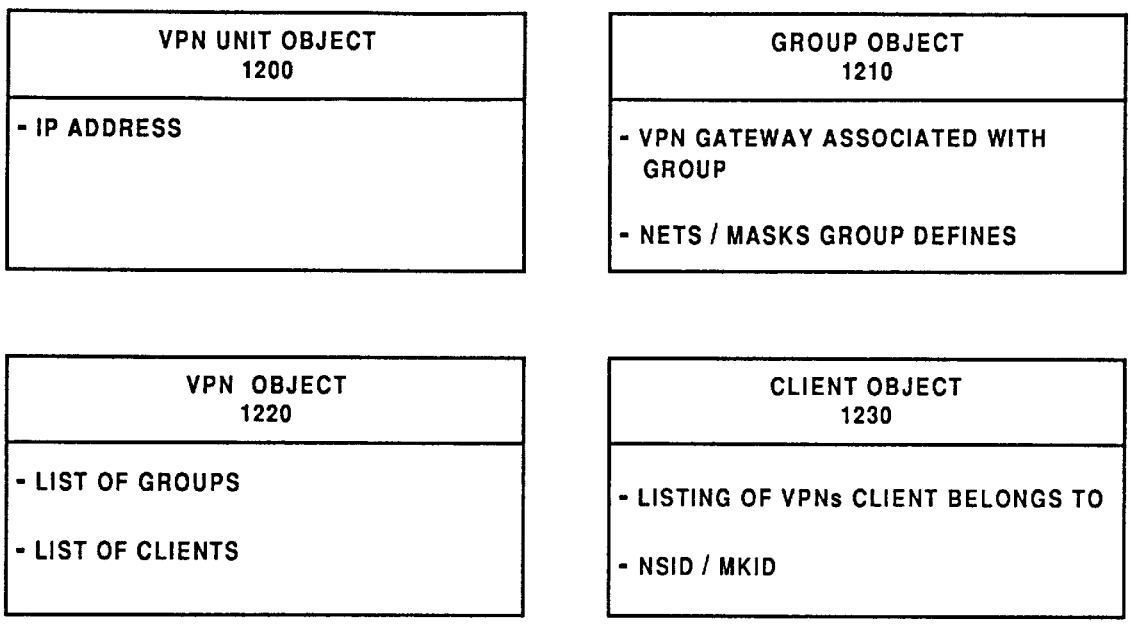
FIG. 12 is a diagram of some of the data objects operated on by high-level commands in accordance with an aspect of the present invention.

FIG. 12 is a diagram of some of the data objects operated on by high-level commands in accordance with an embodiment of the present invention. FIG. 12 includes VPN unit object 1200, group object 1210, VPN object 1220 and client object 1230. A user manipulating VPN management station 160 specifies sequences of operations on the above-listed objects. Hence, the user does not have to directly manipulate lower level addressing information to configure VPN units. This lower level addressing information is automatically generated by VPN management station 160 and sent to the appropriate VPN units. A VPN unit object 1200 is created for each VPN unit in the network. A VPN unit object comprises a number of parameters including, for example, the Internet Protocol (IP) address of the VPN unit. A group object 1210 is created for groups of network nodes on public network 100. In this embodiment, a group object includes an attribute identifying the VPN unit(s) associated with the group and the net/mask pairs the group defines. A VPN object 1220 is created for each virtual private network supported by VPN management station 160. A VPN object 1220 comprises a number of attributes, including encryption, authentication and compression algorithms, a list of groups, and a list of remote clients included in the corresponding VPN. A client object 1230 is created for each remote client supported by VPN management station 160. A client object comprises a number of attributes, including a listing of the virtual private networks the client belongs to and the NSID/MKID identifier for the remote client. In one embodiment, the NSID, or name space ID is the MD5 hash of a user name, and the MKID is the master key ID of the domain. These identifiers serve to identify the remote client.

Illustrative Methods of Operation

Figure 13:
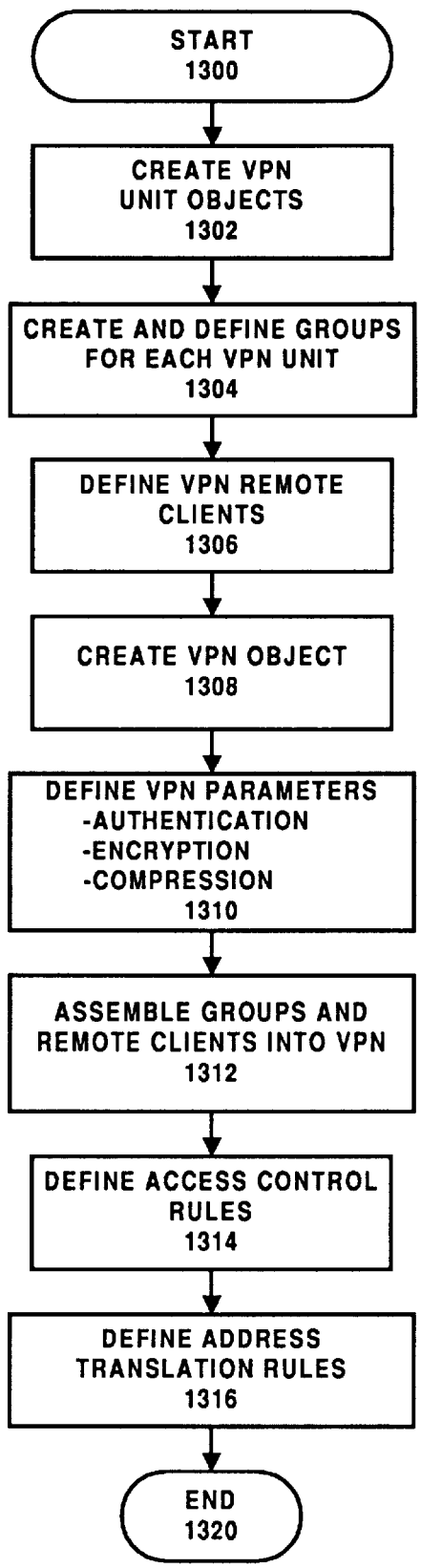
FIG. 13 is a flow chart illustrating some of the operations performed by a VPN system manager to create a VPN in accordance with an aspect of the present invention.

FIG. 13 is a flow chart illustrating some of the operations performed by a VPN system manager to create a VPN in accordance with an embodiment of the present invention. The system manager starts at state 1300 and proceeds to state 1302. In state 1302, the system manager issues commands to create VPN unit objects corresponding to physical VPN units on network 100. Before VPN unit objects are created and added to the VPN unit database, the system manager authenticates each VPN unit and each VPN unit authenticates the system manager. The system manager then proceeds to state 1304.

In state 1304, the system manager issues commands to create and define groups of entities. These entities may be nodes on a computer network that are addressed by IP address identifiers. These entities may also be system users that are identified by user IDs. The system manager then proceeds to state 1306, in which the system manager defines VPN remote clients. Remote clients can connect to a VPN from remote locations, and are identified by NSID/MKID identifiers as described above. The system manager then proceeds to state 1308, in which the system manager issues a command to create a VPN object. The system manager then proceeds to state 1310.

In state 1310, the system manager defines VPN parameters for authentication, encryption, and compression functions to be associated with a newly created VPN. Next, the system manager proceeds to state 1312. In state 1312, the system manager assembles groups of entities and remote clients into a VPN. States 1310 and 1312 are repeated for each VPN that the system manager desires to create.

The system manager then proceeds to state 1314. In state 1314, the system manager defines access control rules for VPN units. These access control rules specify which types of communications are allowed to pass through a VPN unit. For example, an access control rule may specify that communications between non-members of a VPN and members of a particular VPN are not allowed to pass through a particular VPN unit. Next, the system manager proceeds to state 1316.

In state 1316, the system manager specifies address translation rules for each VPN unit. These address translation rules support static translation, dynamic translation and port translation. For example, the rules make it possible to use the same address for two different nodes that are located on different local area networks that are coupled to the public network through VPN units. The VPN units use the address translation rules to translate the same local addresses into different public network addresses. Address translation rules also facilitate mapping multiple local addresses to a single public network address. In one embodiment, this is accomplished by using the same public network address with different port identifiers for different local addresses. The system manager then proceeds to state 1320, which is an end state.

Figure 14:
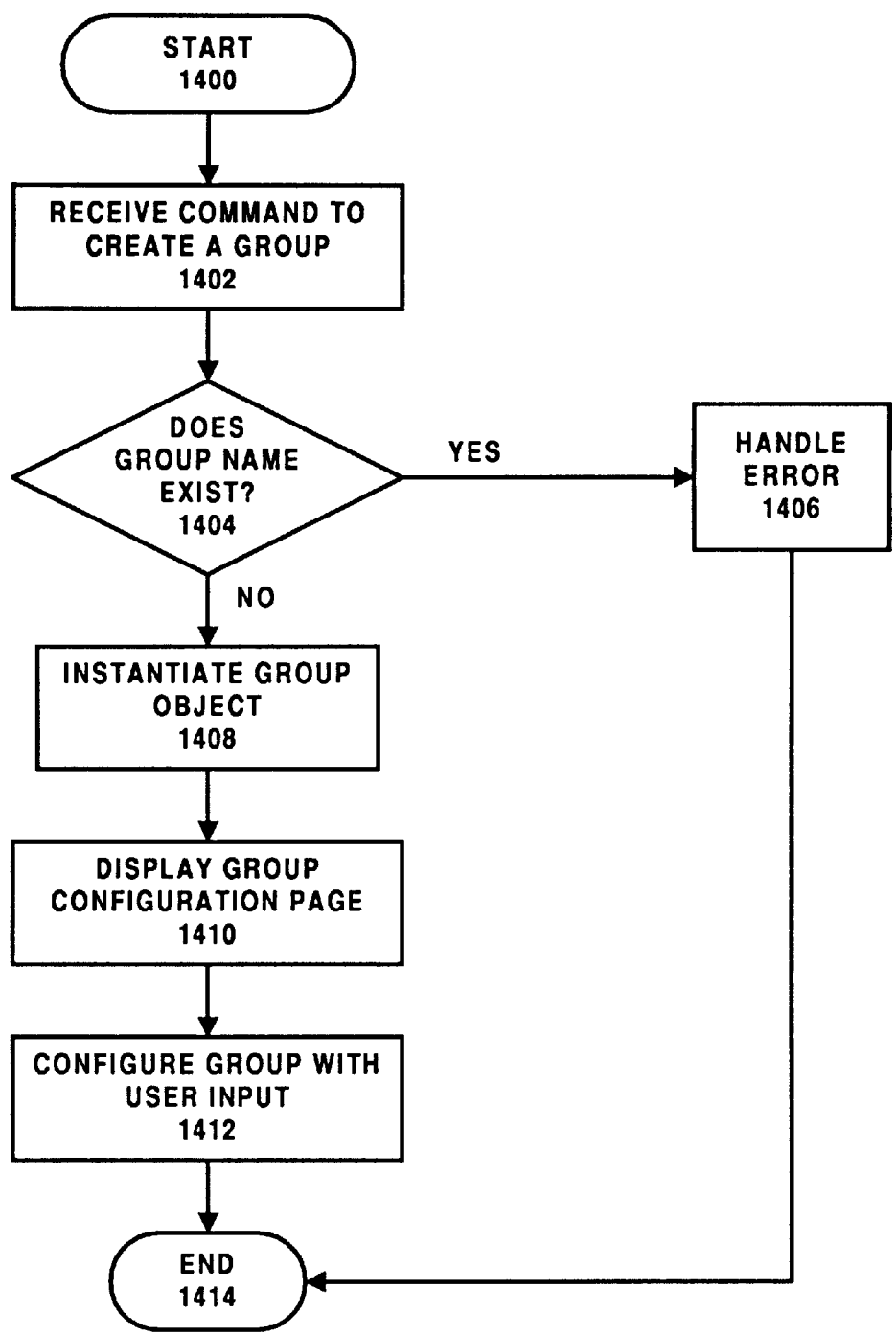
FIG. 14 is a flow chart illustrating some of the operations performed by VPN management station 160 in order to create a group in accordance with an aspect of the present invention.

FIG. 14 is a flow chart illustrating some of the operations performed by VPN management station 160 in order to create a group in accordance with an embodiment of the present invention. The system starts in state 1400 and proceeds to state 1402. In state 1402, the system receives a command to create a group from a VPN system administrator. The system then proceeds to state 1404. In state 1404, the system determines whether or not the name of the new group already exists. If so, the system proceeds to state 1406 in which the system handles the error and then proceeds to state 1414, which is an end state. If not, the system proceeds to state 1408. In state 1408, the system instantiates a group object. The system then proceeds to state 1410. In state 1410, the system displays a group configuration page. The system then proceeds to state 1412. In state 1412, the system configures the group with user input entered into the configuration page. The system then proceeds to state 1414, which is an end state.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. A method of configuring a computer system having a plurality of storage areas, comprising:

receiving a configuration request;

retrieving a pointer to a first storage area having resident therein a first operating system program;

receiving a second operating system program;

storing the second operating system program in a second storage area; and automatically modifying the pointer to point to the second storage area in response to the storage of the second operating system;

wherein the pointer identifies, before the system is rebooted, one of the plurality of storage areas containing an operating system program to be loaded when the computer system is rebooted.

2. The method of claim 1, further comprising:

receiving a request to reboot the computer system;

rebooting the computer system;

retrieving the pointer; and loading the second operating system program from the second storage area.

3. The method of claim 2, further comprising:

running the second operating system;

if the second operating system fails, modifying the pointer to point to the first storage area; and loading the first operating system program from the first storage area.

4. The method of claim 2, further comprising:

incrementing a counter when the computer system is rebooted; and modifying the pointer to identify the first storage area if a pre-specified number of reboot operations is detected in a pre-determined period of time.

5. The method of claim 2, wherein the request to reboot the computer system is received from a remote manager.

6. The method of claim 1, wherein receiving the second operating system program comprises:

accepting a stream of binary data through a communication port of the computer system;

storing the binary data stream in a third storage area; and verifying the integrity of the binary data stream.

7. The method of claim 1, wherein the plurality of storage areas includes a first flash memory.

8. The method of claim 7, wherein the plurality of storage areas further includes a second flash memory.

9. The method of claim 1, wherein the configuration request is received from a manager coupled to the computer system via a communication link.

10. The method of claim 1, wherein storing the second operating system program comprises overwriting a third operating system program stored in the second storage area.

11. The method of claim 1, wherein the computer system is part of a virtual private network unit for passing secure communications between members of a virtual private network.

12. The method of claim 11, wherein the configuration request and request to reboot the computer system are received from a virtual private network manager.

13. The method of claim 12, further comprising authenticating the virtual private network manager.

14. An apparatus comprising:

a first storage area for storing a first operating system program;

a second storage area for storing a second operating system program;

an identification mechanism for selectively identifying one of the first storage area or the second storage area, the identification mechanism identifying the first storage area in a first state;

a processor for executing an operating system program resident in one of the first storage area or second storage area; and a communication port;

wherein the identification mechanism is automatically modified in a second state to identify the second storage area in response to receiving the second operating system through the communication port.

15. The apparatus of claim 14, wherein the identification mechanism identifies, before the apparatus reboots, the storage area from which an operating system program will be loaded when the apparatus reboots.

16. The apparatus of claim 14, wherein the second operating system program received through the communication port is stored in the second storage area.

17. The apparatus of claim 16, further comprising a counter for counting the number of times the apparatus reboots after the second operating system program is stored in the second storage area.

18. The apparatus of claim 17, wherein the identification mechanism is modified in a third state to identify the first storage area if the counter is increased to a pre-determined number within a pre-specified period of time.

19. The apparatus of claim 14, wherein the identification mechanism is modified in a third state to identify the first storage area.

20. The apparatus of claim 19, wherein in the third state the identification mechanism is automatically modified to identify the first storage area in response to a command received through the communication port from an external computer system.

21. The apparatus of claim 14, wherein the identification mechanism is configured to identify the first storage area so that the first operating system program will be loaded, after a failure of the second operating system program is detected.

22. The apparatus of claim 14, wherein the first storage area is a flash memory.

23. The apparatus of claim 22, wherein the second storage area is a flash memory.

24. The apparatus of claim 14, wherein a command to reboot is received through the communication port, in response to which the apparatus reboots and loads an operating system program from the storage area identified by the identification mechanism.

25. The apparatus of claim 14, wherein the apparatus is part of a virtual private network unit providing a method of exchanging secure communications between a first computer system and a second computer system.

26. A method of operating a computer system having a processor, comprising:

storing a first operating system program in a first storage area;

storing a second operating system program in a second storage area;

storing a pointer to the first storage area;

executing instructions according to the first operating system program;

automatically replacing the pointer to the first storage area with a pointer to the second storage area in response to the storage of the second operating system program;

rebooting the computer system; and executing instructions according to the second operating system program.

27. The method of claim 26, further comprising:

receiving a third operating system program comprising a data stream;

verifying the integrity of the data stream;

storing the third operating system program in the first storage area, thereby replacing the first operating system program;

replacing the pointer to the second storage area with a pointer to the first storage area; and rebooting the computer system.

28. The method of claim 27, further comprising:

initializing a counter;

incrementing the counter each time the computer system reboots; and replacing the pointer to the first storage area with a pointer to the second storage area if the counter is incremented to a pre-specified value in a pre-determined period of time.

29. The method of claim 26, further comprising replacing the pointer to the second storage area with a pointer to the first storage area.

30. The method of claim 29, further comprising:

rebooting the computer system; and executing instructions according to the first operating system program.

31. The method of claim 26, wherein the computer system is part of a virtual private network unit for passing secure communications between members of a virtual private network.

32. The method of claim 31, further comprising:

receiving a data packet from a first member of the virtual private network;

transforming the data packet; and transmitting the transformed data packet to a second member of the virtual private network.

33. The method of claim 32, wherein the transforming step comprises encrypting the data packet.

34. The method of claim 32, wherein the transforming step comprises decrypting the data packet.

35. An apparatus for processing data communications, comprising:

a first nonvolatile storage area for storing a first sequence of operating instructions;

a second nonvolatile storage area for storing a second sequence of operating instructions;

an identifier for identifying one of the first storage area or the second storage area, the identifier being selectively switchable;

a processor for executing the sequence of operating instructions stored in the storage area identified by the identifier; and a communication port electrically coupled to a manager;

wherein the identifier is automatically switched from identifying the first storage area in a first state, to identifying the second storage in a second state, in response to a command received from the manager through the communication port.

36. The method of claim 35, wherein the command comprises a third sequence of operating instructions that is stored in the second storage area.

37. The method of claim 36, wherein the apparatus reboots after storing the third sequence of operating instructions and the processor executes according to the third sequence of operating instructions.

38. A method of configuring a computer system, comprising:

receiving a request to replace a first operating system program stored on the computer system with a second operating system program;

retrieving the second operating system program;

examining a single pointer configured to identify, among a plurality of operating system program storage areas, a first storage area in which the first operating system program is stored;

transmitting the second operating system program to the computer system;

receiving verification that the second operating system program has replaced the first operating system program;

automatically changing the single pointer to identify, among the plurality of operating system program storage areas, a second storage area in which the second operating system program is stored; and rebooting the computer system.

39. The method of claim 38, wherein the rebooting step comprises automatically determining, by examining only the single pointer, from which of the plurality of operating system storage areas an operating system program is to be loaded.

* * * * *